United States Patent
Witten

(10) Patent No.: US 7,034,740 B2
(45) Date of Patent: Apr. 25, 2006

(54) METHOD AND APPARATUS FOR IDENTIFYING BURIED OBJECTS USING GROUND PENETRATING RADAR

(75) Inventor: Alan Witten, Norman, OK (US)

(73) Assignee: Witten Technologies, Inc., Boston, MA (US)

( * ) Notice: Subject to any disclaimer, the term of this patent is extended or adjusted under 35 U.S.C. 154(b) by 11 days.

(21) Appl. No.: 10/769,965

(22) Filed: Feb. 2, 2004

(65) Prior Publication Data

US 2004/0155810 A1    Aug. 12, 2004

Related U.S. Application Data

(63) Continuation of application No. 10/118,991, filed on Apr. 10, 2002, now Pat. No. 6,700,526, which is a continuation-in-part of application No. 10/079,807, filed on Feb. 22, 2002, which is a continuation of application No. 09/866,575, filed on May 29, 2001, now abandoned, which is a continuation of application No. 09/658,188, filed on Sep. 8, 2000, now abandoned.

(60) Provisional application No. 60/284,921, filed on Apr. 20, 2001.

(51) Int. Cl.
G01S 13/88 (2006.01)
G01S 13/89 (2006.01)
G01S 13/00 (2006.01)

(52) U.S. Cl. .............................. 342/22; 342/27; 342/59; 342/175; 342/176; 342/179; 342/189; 342/195; 342/196

(58) Field of Classification Search .................. 702/12; 342/21, 22, 25, 27, 28, 59, 89, 90, 118, 127–132, 342/134–145, 175, 192–197

See application file for complete search history.

(56) References Cited

U.S. PATENT DOCUMENTS

| | | | |
|---|---|---|---|
| 3,665,466 A | | 5/1972 | Hibbard |
| 4,072,942 A | * | 2/1978 | Alongi ......................... 342/22 |
| 4,698,634 A | * | 10/1987 | Alongi et al. .................. 342/22 |
| 4,706,031 A | | 11/1987 | Michiguchi et al. |
| 4,835,474 A | | 5/1989 | Parra et al. |
| 4,905,008 A | * | 2/1990 | Kawano et al. ................ 342/22 |

(Continued)

FOREIGN PATENT DOCUMENTS

EP  0812005 A2  12/1997

(Continued)

OTHER PUBLICATIONS

J. K. van Deen and J. W. de Feijter, "Three-Dimensional Ground Probing Radar", Geological Survey of Finland, Special Paper 16, pp. 35-40, Jun. 1992.

*Primary Examiner*—Bernarr E. Gregory
(74) *Attorney, Agent, or Firm*—McDermott Will & Emery LLP

(57) ABSTRACT

An apparatus for identifying a buried object using ground penetrating radar (GPR) in a system containing at least one GPR sensor, comprises a data processor for detecting spatial correlations in data received from a GPR sensor in the apparatus and an image processor capable of building a data structure corresponding to an image of the buried object from data processed by the data processor. A method for identifying a buried object using GPR in a system containing a GPR sensor comprising detecting spatial correlations in data received from the GPR sensor in the system and building a data structure corresponding to an image of the buried object from the received data.

10 Claims, 15 Drawing Sheets

U.S. PATENT DOCUMENTS

| | | | |
|---|---|---|---|
| 5,130,711 A * | 7/1992 | Kimura et al. | 342/22 |
| 5,248,975 A | 9/1993 | Schutz | |
| 5,337,053 A * | 8/1994 | Dwyer | 342/90 |
| 5,339,080 A | 8/1994 | Steinway et al. | |
| 5,384,715 A * | 1/1995 | Lytton | 702/12 |
| 5,499,029 A * | 3/1996 | Bashforth et al. | 342/22 |
| 5,579,430 A | 11/1996 | Grill et al. | |
| 5,592,170 A * | 1/1997 | Price et al. | 342/22 |
| 5,614,909 A | 3/1997 | Komatsu et al. | |
| 5,644,314 A * | 7/1997 | Ahmad et al. | 342/22 |
| 5,704,142 A * | 1/1998 | Stump | 342/22 |
| 5,742,735 A | 4/1998 | Eberlein | |
| 5,835,053 A | 11/1998 | Davis | |
| 5,835,054 A | 11/1998 | Warhus et al. | |
| 5,886,661 A * | 3/1999 | Harrison et al. | 342/22 |
| 5,900,833 A | 5/1999 | Sunlin et al. | |
| 5,912,639 A * | 6/1999 | Beckner | 342/22 |
| 5,920,285 A | 7/1999 | Benjamin | |
| 6,002,357 A | 12/1999 | Redfern et al. | |
| 6,100,839 A | 8/2000 | Heger et al. | |
| 6,130,641 A | 10/2000 | Kraeutner et al. | |
| 6,222,481 B1 * | 4/2001 | Abrahamson et al. | 342/90 |
| 6,252,538 B1 * | 6/2001 | Chignell | 342/22 |
| 6,377,201 B1 * | 4/2002 | Chu | 342/22 |
| 6,396,433 B1 * | 5/2002 | Clodfelter | 342/22 |
| 6,496,137 B1 | 12/2002 | Johansson | |
| 6,700,526 B1 | 3/2004 | Witten | |
| 2003/0043087 A1 | 3/2003 | Johansson et al. | |

FOREIGN PATENT DOCUMENTS

| | | |
|---|---|---|
| JP | 59-37474 | 2/1984 |
| JP | 59-231466 | 12/1984 |
| JP | 60-235080 | 11/1985 |
| JP | 1-274092 | 11/1989 |
| WO | WO88/04063 | 6/1988 |

* cited by examiner

METHOD AND APPARATUS FOR IDENTIFYING BURIED OBJECTS USING GROUND PENETRATING RADAR

RELATED APPLICATIONS

This patent application is a continuation of U.S. patent application Ser. No. 10/118,991 filed Apr. 10, 2002 now U.S. Pat. No. 6,700,526, which is a continuation-in-part of U.S. patent application Ser. No. 10/079,807 filed Feb. 22, 2002, which is a continuation of U.S. patent application Ser. No. 09/866,575 filed May 29, 2001 (now abandoned), which is a continuation of U.S. patent application Ser. No. 09/658,188 filed Sep. 8, 2000 (now abandoned), which is herein incorporated by reference in its entirety and which claims priority to U.S. Provisional Patent Application No. 60/284,921 filed Apr. 20, 2001, entitled Method and Apparatus for Identifying Buried Objects Using Ground Penetrating Radar, which is herein incorporated by reference in its entirety.

BACKGROUND OF THE INVENTION

The present invention relates to ground-penetrating radar (GPR) systems and methods, and more particularly to ground-penetrating radar systems and methods for identifying buried objects.

GPR is similar to upward-looking radar used for air traffic control and meteorology, except that the antenna array is directed toward the ground; thus presenting an entirely different set of technical challenges. For example, GPR is used for geophysical applications such as mapping subsurface strata, locating toxic waste sites for remediation, and detecting of unexploded subsurface ordinance.

A GPR system comprises at least one transmitter that transmits an electromagnetic impulse, continuous wave, or swept frequency signal, for example, in the frequency range of 1 MHz to 10 GHz. The system also comprises at least one receiver that receives a reflected waveform. The impulse is short with respect to the wavelength being transmitted. In practice, the impulse can be, for example, one or two cycles. Therefore, GPR systems are sometimes referred to as "impulse" radars.

Subsurface industries such as construction, utility location, environmental remediation, and unexploded-ordnance detection have long sought safe, reliable, cost-effective methods for "seeing into the ground." The utility location market suffers greatly from inadequate location technologies that result in hundreds of millions of dollars in damages, delays, and lost revenue for utility companies and contractors every year, losses that can be reduced significantly by use of GPR. Three utility locating market segments, can be distinguished by their accuracy and price: (1) One Call; (2) private locating; and (3) subsurface utility engineering (SUE).

"One Call" is a nationwide clearinghouse that provides an alert to all public and private utilities of when and where construction may impact their lines. By law, contractors must register their site with One Call, which in turn contacts all the relevant utilities so they can mark their utility lines. One Call locating systems are based on electromagnetic induction technology. Utility companies, responding to a One Call work order, guarantee accuracy on conductive lines within twenty-four inches horizontally on either side, with no guarantee of depth. With One Call, utility line locations are simply painted temporarily on the ground, easily subject to erosion or destruction. This poor accuracy results in broken utility lines and revenue loss.

Construction, utility, and industrial companies often rely on "private locating." Private locating provides a greater degree of accuracy than is delivered by One Call. These companies often hire a utility locating company or a geophysics company to apply more expensive and time-consuming locating techniques. Private locating companies typically use electromagnetic induction technology, GPR, and magnetometry. Often this includes excavation, the most reliable and expensive conventional method for determining the exact location of utilities.

Industrial and utility companies, however, frequently require more accurate maps of the subsurface than One Call or private locating can provide. For instance, extra accuracy may be needed while excavating near an oil pipeline because of the rise of breaking a pipe. Or, it may be too costly to accidently cut an interstate fiber optic cable carrying important communications. In such situations, excavators perform a total cost/value analysis, including consideration of risk/cost avoidance. Often, they are more willing to pay higher fees to ensure greater accuracy.

"SUE" can provide more accuracy than One Call or private locating. SUE is a rapidly growing specialty service offered by geophysical and engineering companies. It entails planning and designing utility arrangements before highway or other large infrastructure construction. SUE engineers painstakingly map all discernible utilities at a given site using a variety of conventional geophysical methods. SUE uses electromagnetic induction technology, GPR, and magnetometry. It is generally more costly than private locating services because it uses computer aided design to produce a permanent record of the location of utilities. Even this premium service often only identifies 80% of utilities with certainty, frequently less when unknown non-conductive utilities are present. Further, SUE is very expensive. Accordingly, there is, therefore, a need for systems that overcome the limitations of the conventional techniques.

SUMMARY OF THE INVENTION

The present invention provides a methodology for identifying buried objects using ground penetrating radar. Additional features and advantages of the invention will be set forth in the description which follows, and in part, will be apparent from the description, or may be learned by practicing the invention. The objectives and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, an apparatus and method according to the invention identifies buried objects using GPR. An apparatus for identifying a buried object using ground penetrating radar (GPR) in a system containing at least one GPR sensor, comprises a data processor for detecting spatial correlations in data received from a GPR sensor in the apparatus and an image processor capable of building a data structure corresponding to an image of the buried object from data processed by the data processor. A method for identifying a buried object using GPR in a system containing a GPR sensor comprising detecting spatial correlations in data received from the GPR sensor in the system and building a data structure corresponding to an image of the buried object from the received data.

Both the foregoing general description and the following detailed description are exemplary and explanatory and are intended to provide further explanation of the invention as claimed.

DESCRIPTION OF THE FIGURES

The accompanying drawings, which are incorporated in and constitute part of the specification, illustrate an embodiment of the invention and together with the general description given above and detailed description of the embodiment given below, serve to explain the principles of the invention.

DETAILED DESCRIPTION OF THE INVENTION

Figure 1:
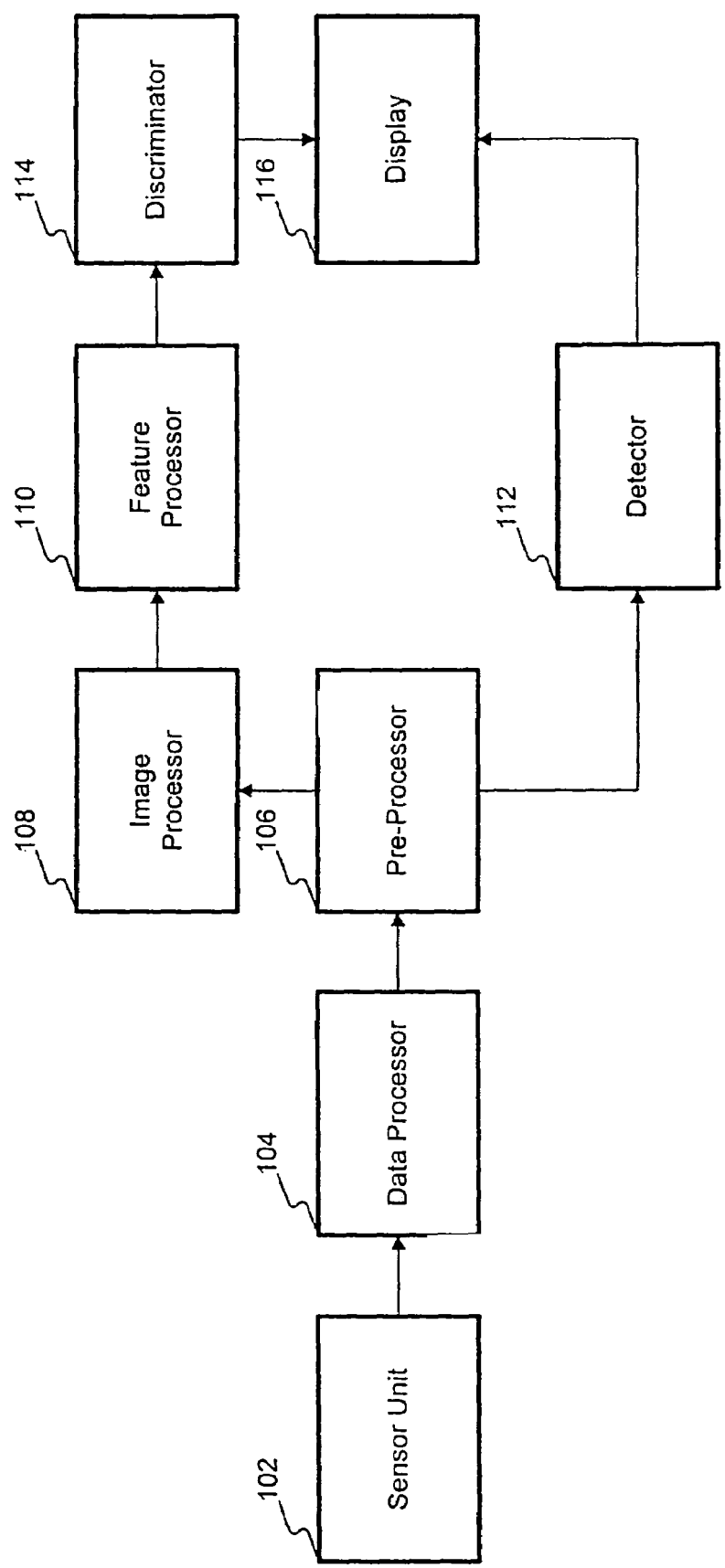
FIG. 1 is an embodiment of an apparatus for identifying buried objects using ground-penetrating radar.

A method and system is disclosed for identifying buried objects using ground-penetrating radar. FIG. 1 is an embodiment of an apparatus for identifying buried objects using ground-penetrating radar consistent with the present invention. The apparatus of FIG. 1 includes sensor unit 102, data processor 104, pre-processor 106, image processor 108, feature processor 110, detector 112, discriminator 114, and display 116.

Figure 2:
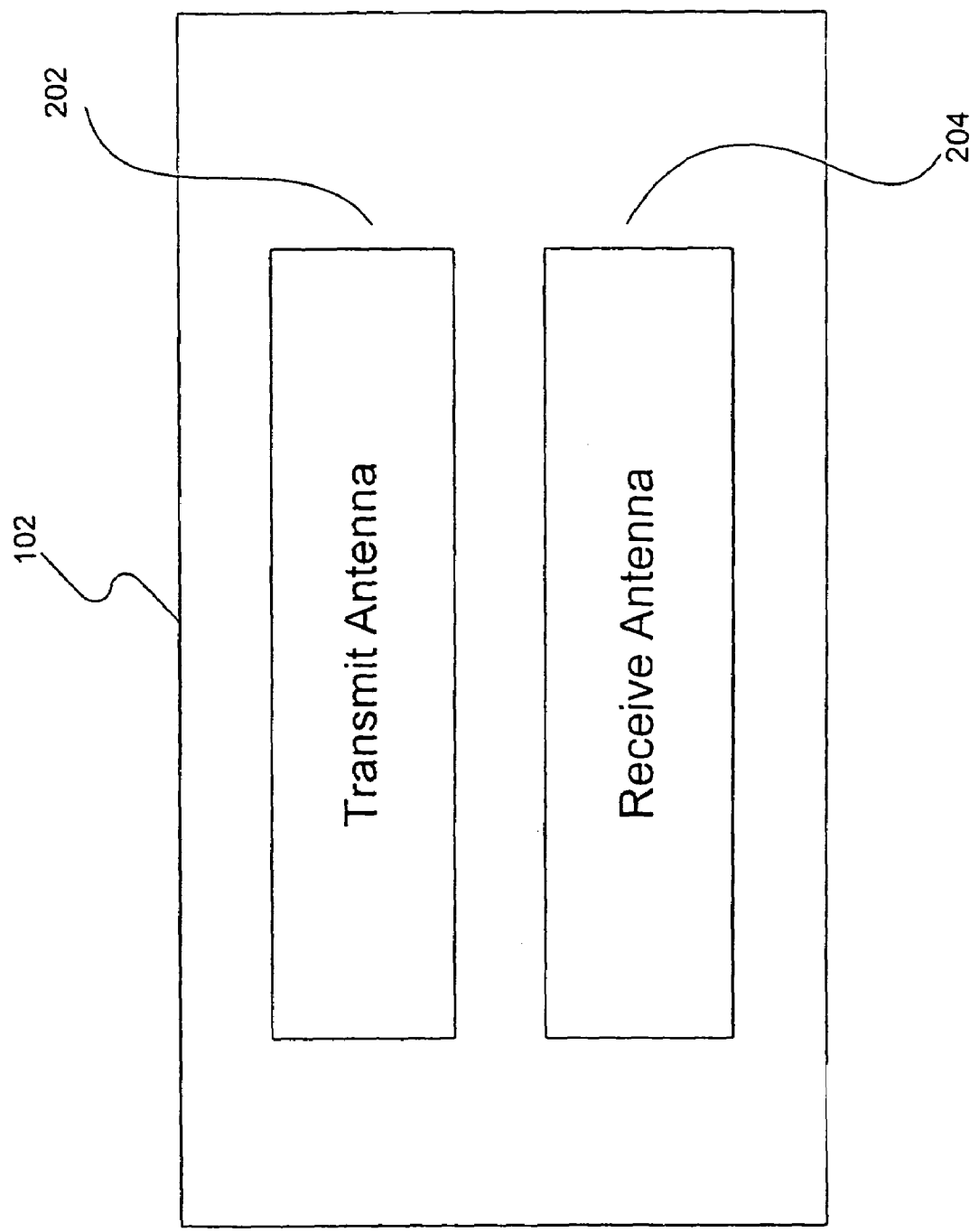
FIG. 2 is a detailed view of sensor unit 102.

FIG. 2 is a detailed view of sensor unit 102. An embodiment of sensor unit 102 consistent with the present invention includes transmit antenna 202 and receive antenna 204. Transmit antenna 202 emits GPR waves used to probe for buried objects. Receive antenna 204 receives the transmitted GPR waves as they are reflected from the ground and from objects located beneath the ground. Sensor unit 102 controls the characteristics of the transmitted GPR signal (in some instances receiving support from data processor 104 as will be descried in greater detail below) and receives the reflected signal. Suitable antennas for the present invention include, for example, small broadband antennas with a broad beam pattern having a frequence response spanning at least two octaves.

Figure 3:
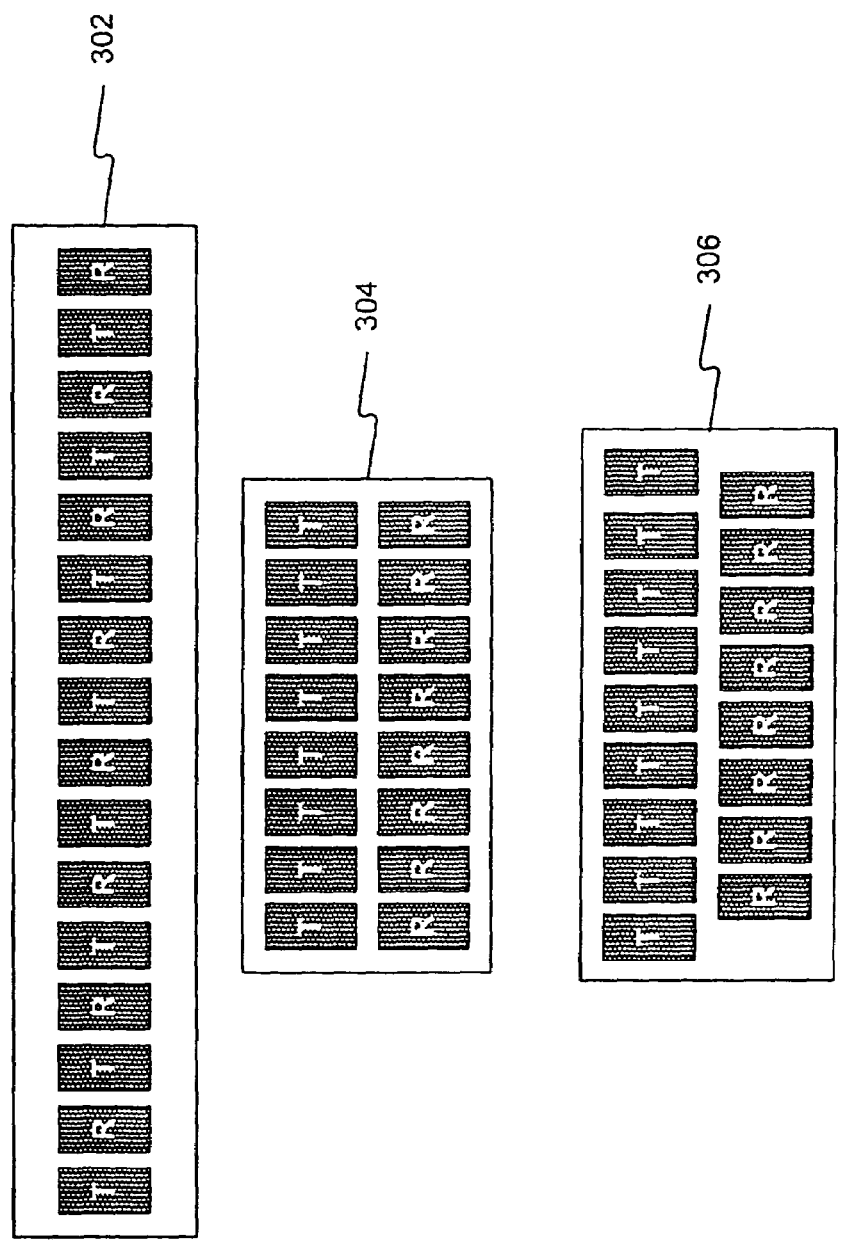
FIG. 3 is a block diagram of three suitable antenna geometries.

Those skilled in the art will recognize that there are many suitable geometries for the arrangement of antenna elements in transmit antenna 202 and receive antenna 204. For example, three suitable antenna geometries consistent with the present invention are shown in FIG. 3. Antenna 302 has antenna transmitters ("T") and receivers ("R") arranged in a single line, with alternating transmitter and receiver elements. Antenna 304 has one row of transmitter elements and a parallel row of receiver elements. Antenna 306 has one row of transmitter elements and a parallel row of receiver elements with the receiver element row offset from the row of transmitter elements. Each antenna can have the same polarization or polarization can vary among the antennas. Additional antenna arrangements consistent with the present invention are described in U.S. Patent Provisional Application No. 60/152,607 and in corresponding non provisional U.S. patent application Ser. No. 09/658,188.

Although FIG. 3 depicts sensor units comprised of arrays of antenna elements, an embodiment of sensor unit 102 consistent with the present invention includes a pair of transmit and receive antenna elements that are moved during data acquisition to simulate data acquisition using an array. Throughout this application wherever exemplary embodiments are discussed using arrays of antenna elements, once skilled in the art will recognize that such transmit/receive antenna pairs may be used instead of arrays, or in combination with arrays.

Figure 4:
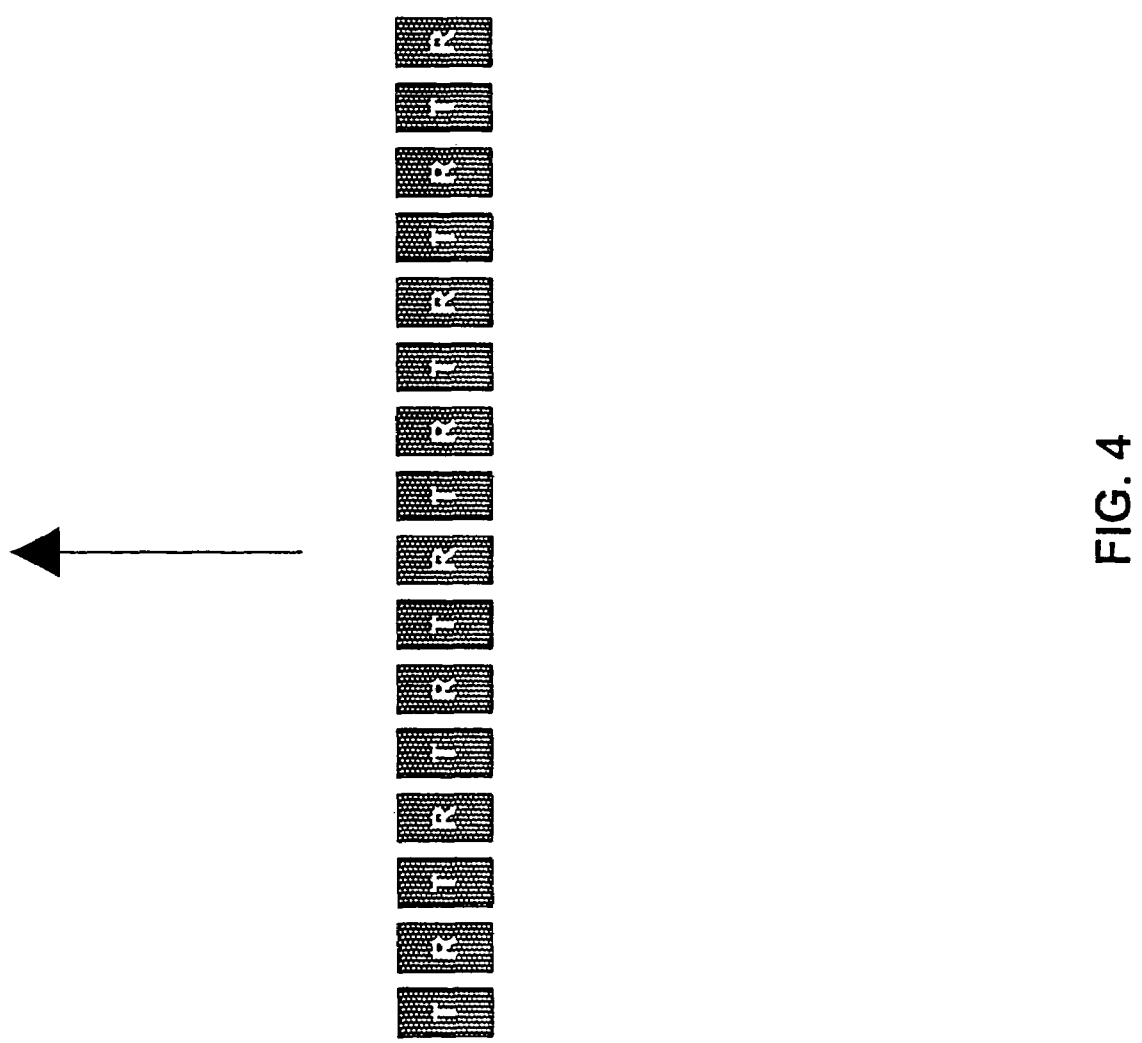
FIG. 4 illustrates a direction of movement in antenna array configuration 302 with a single line of transmitter and receiver antenna elements.
Figure 5:
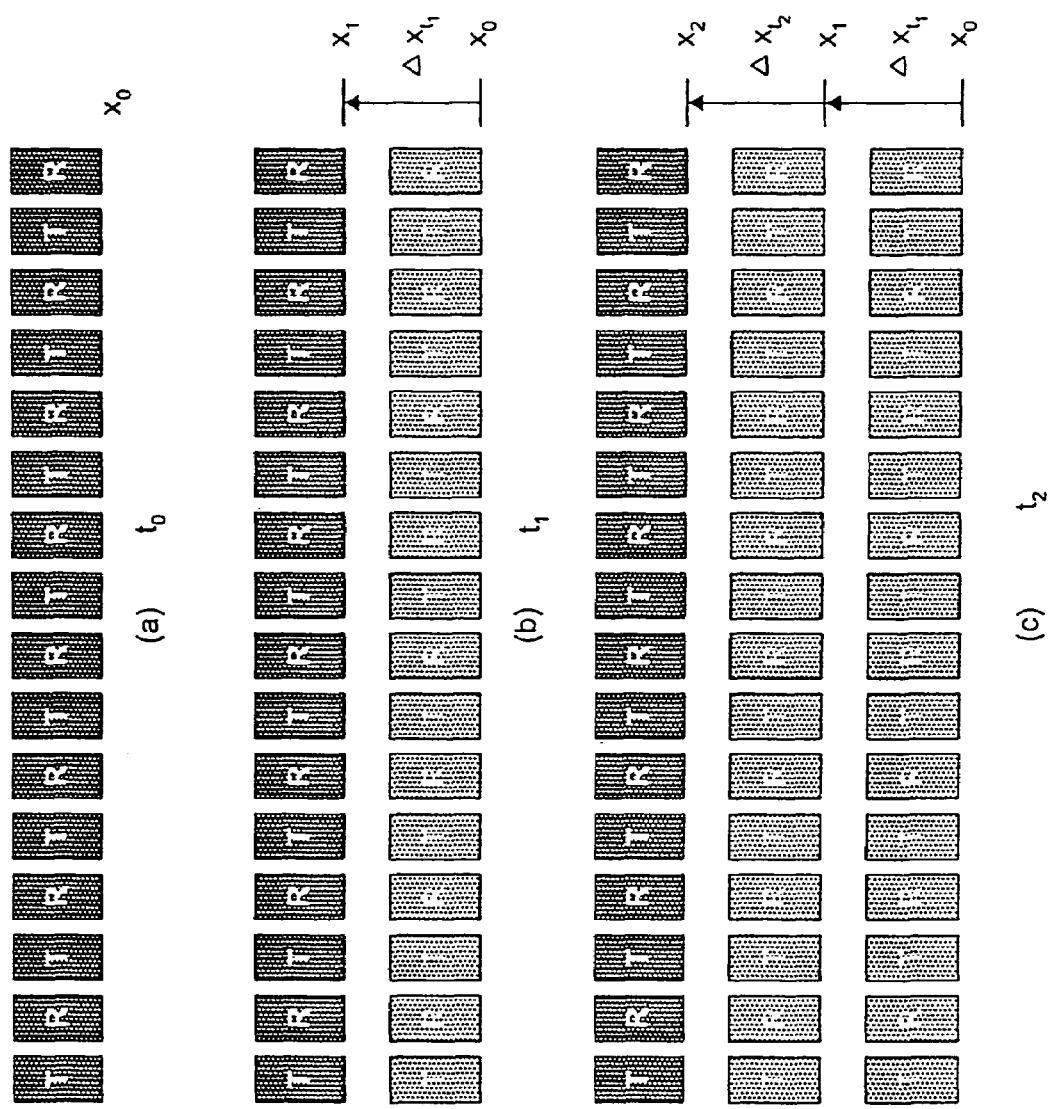
FIG. 5 is a schematic diagram of data acquisition at three different time steps t0, t1, and t2 using the array configuration and scan direction shown in FIG. 4.

To acquire data over a planar surface, for example the ground, the antennas in sensor unit 102 are preferably moved in a direction that is perpendicular to the line formed by the transmit and receive antenna arrays. For example, FIG. 4 illustrates an example of a direction of movement (indicated by the arrow) in antenna array configuration 302 with a single line of transmitter and receiver antenna elements. FIG. 5 is a schematic diagram of data acquisition at three different time steps t0, t1, and t2 (FIGS. 5(a), 5(b), and 5(c), respectively) using the array configuration and scan direction shown in FIG. 4. As shown in FIG. 5(a), at time t0 data are acquired over all antennas in the array at a fixed position x0. At time t1 the antenna array is moved preferably by a fixed amount Δx to position x1 (FIG. 5(b)). Once at position x1, data are acquired over all antennas in the array at the new position. FIGS. 5(b) and 5(c) include shaded antenna array elements showing the locations of the antenna elements at previous time steps. At time t2 the antenna array is moved again by a fixed amount Δx to position x2 (FIG. 5(c)). Once at position x2, data are acquired over all antennas in the array at the new position. This process continues for a number of iterations sufficient to scan a region of interest over a buried object. Note also that scanning can also be non-linear, e.g., Δx is not fixed at each time interval.

Figure 6:
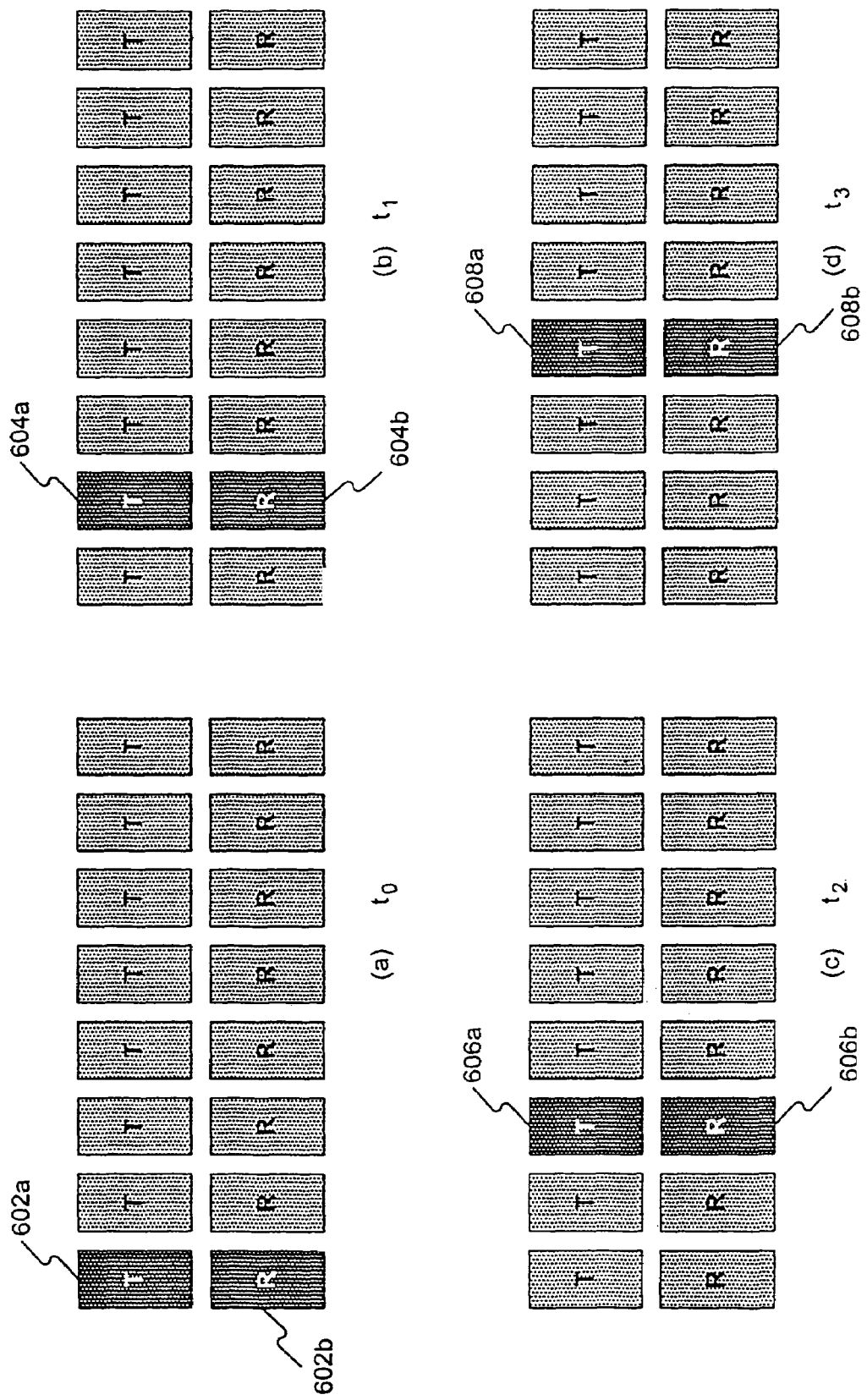
FIG. 6 is a schematic diagram of the antenna array elements in a configuration of sensor unit 102 for monostatic data acquisition.

Data processor 104 can generate control signals that ensure proper operation of sensor unit 102 when acquiring data as illustrated in FIGS. 4 and 5. Moreover, data processor 104 processes data received by sensor unit 102. Two techniques for acquiring and processing data using sensor unit 102 and data processor 104 consistent with the present invention are monostatic and multistatic processing. In monostatic data acquisition, data processor 104 assumes that a transmitting and receiving antenna are paired such that the data acquired simulates a single pair of antennas moved in unison. FIG. 6 is a schematic diagram of the antenna array elements in a configuration of sensor unit 102 for monostatic data acquisition. As shown in FIG. 6(a), during period t0, sensor unit 102 fires transmit antenna element 602a and then receive antenna element 602b records the reflected GPR signal. During period t1, sensor unit 102 activates the next transmit and receive antenna elements 604a and 604b, respectively, in the array (FIG. 6(b)). The remaining transmit and receive antenna elements are activated in pairs at successive time intervals, e.g., transmit element 606a and receive element 606b are activated during period t2 (FIG. 6(c)), transmit element 608a and receive element 608b are activated during period t3 (FIG. 6(d)), etc. In an alternative embodiment of a monostatic data acquisition consistent with the present invention, a transmitter can be paired with more than one receiver or vice versa. An embodiment of data processor 104 consistent with the present invention includes a monostatic data processor that recognizes the manner in which sensor unit 102 acquires data representing the buried object. The monostatic data processor then processes data accordingly to extract a signal representing the buried object.

Figure 7:
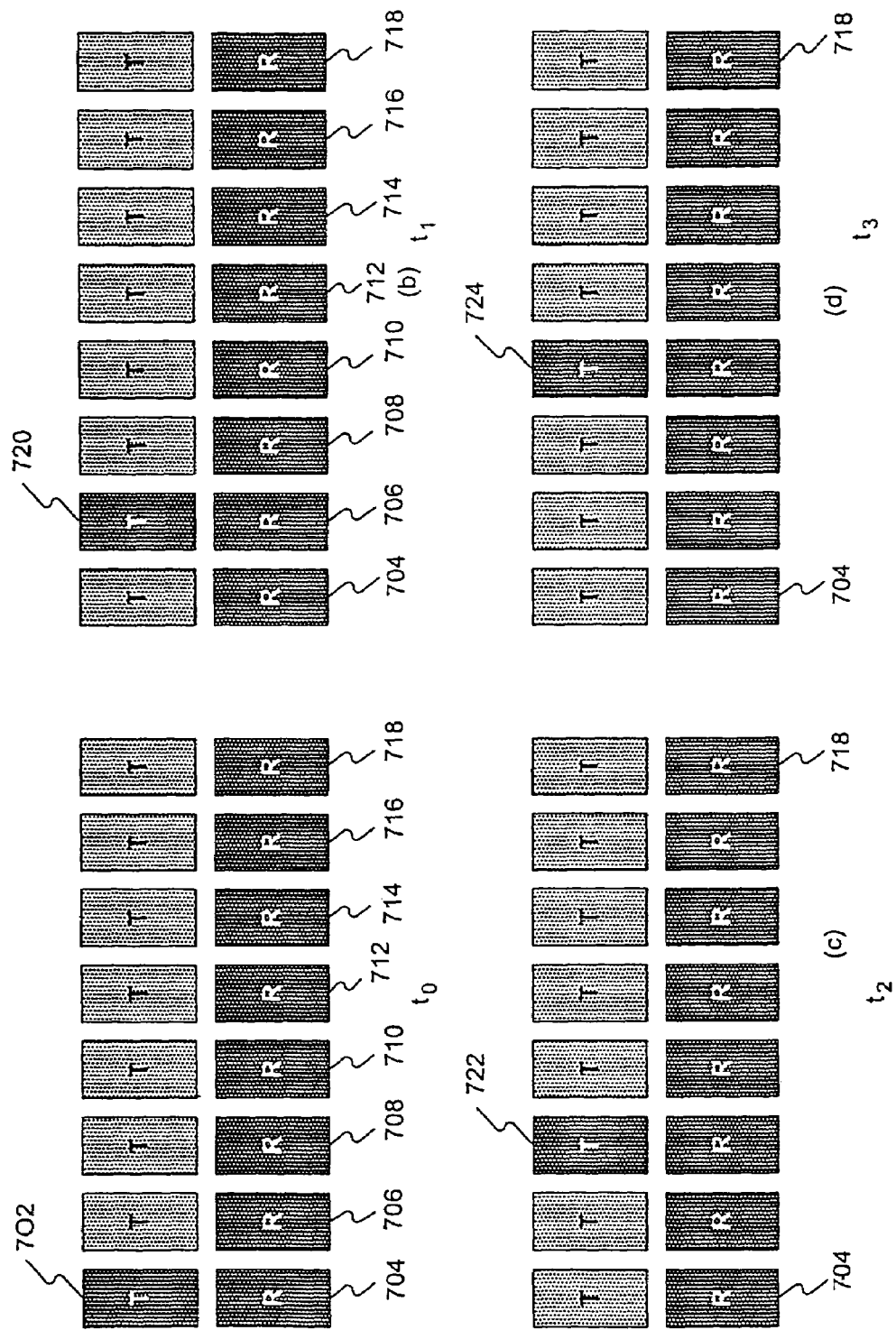
FIG. 7 is a schematic diagram of multistatic data acquisition.

FIG. 7 is a schematic diagram of multistatic data acquisition. In multistatic (sometimes also referred to as bistatic) data acquisition mode, data is acquired at all receivers for every transmitter at each time period. In an embodiment of sensor unit 102 consistent with the present invention, during period to transmit element 702 fires and each of the receive elements 704–718 record the reflected GPR wave (FIG. 7(a)). During period t1, transmit element 720 fires and each of the receive elements 704–718 record the reflected GPR wave (FIG. 7(b)). During subsequent time periods t2 (FIG. 7(c)) and t3 (FIG. 7(d)), transmit elements 722 and 724, respectively, fire and the resultant GPR waves are recorded by receive elements 704–718. This process continues over successive time intervals until data acquisition processor 102 has activated each of the transmit antenna elements. As stated above, note also that this technique of multistatic data acquisition can be performed by moving a pair of antenna elements to simulate data acquisition using an array.

An embodiment of data processor 104 consistent with the present invention includes a multistatic data processor that recognizes the manner in which sensor unit 102 acquires data representing the buried object. The multistatic data processor then processes data accordingly to extract a signal representing the buried object. An embodiment of a multistatic data acquisition processor consistent with the present invention has either a dedicated data acquisition channel for each receiver or a multiplexer for sequentially multiplexing through some lesser number of data acquisition channels.

Among other operations described above, including operations those skilled in the art will recognize are consistent with the present invention, data processor 104 in the apparatus of FIG. 1 performs system calibration operations including, for example, one or more of the following: time alignment, wave speed analysis, and impulse response function computation (which can include, for example, beam pattern and spectral response computations). Each of these operation is described in greater detail below. Generally, data processor 104 processes data received from sensor unit 102 to extract a meaningful signal corresponding to buried object in a surveyed region. An embodiment of data processor 104 consistent with the present invention is comprised of a processor that executes stored computer program code designed to implement calibration operations. One skilled in the art will recognize that an embodiment of data processor 104 implemented entirely in software, entirely in hardware, or in an embodiment allocating calibration functions among hardware and software elements, either distributed or centralized, is consistent with the scope of the present invention.

An embodiment of data processor 104 consistent with the present invention can include a time alignment calculator that performs time alignment to compensate for the difference in wave propagation speed in air versus its propagation speed in geological material. Electromagnetic waves generated by a GPR system consistent with the present invention travel at the speed of light through geological objects. Generally, electromagnetic signals travel between controlling system electronics and the antennas at a propagation speed near that of the wave speed in the host medium. Accordingly, unless compensated for, this can prevent accurate absolute time registration, i.e., determining the actual time at which the transmitted wave leaves the transmitting antenna. Moreover, in an array-based system, electronic circuitry can differ for each antenna pairing. Consequently, an embodiment of data processor 104 consistent with the present invention performs time alignment for each antenna pairing used in sensor unit 102. Moreover an embodiment of data processor 104 consistent with the present invention can include a wave speed calculator to compute wave speed as described in greater detail below.

Figure 8:
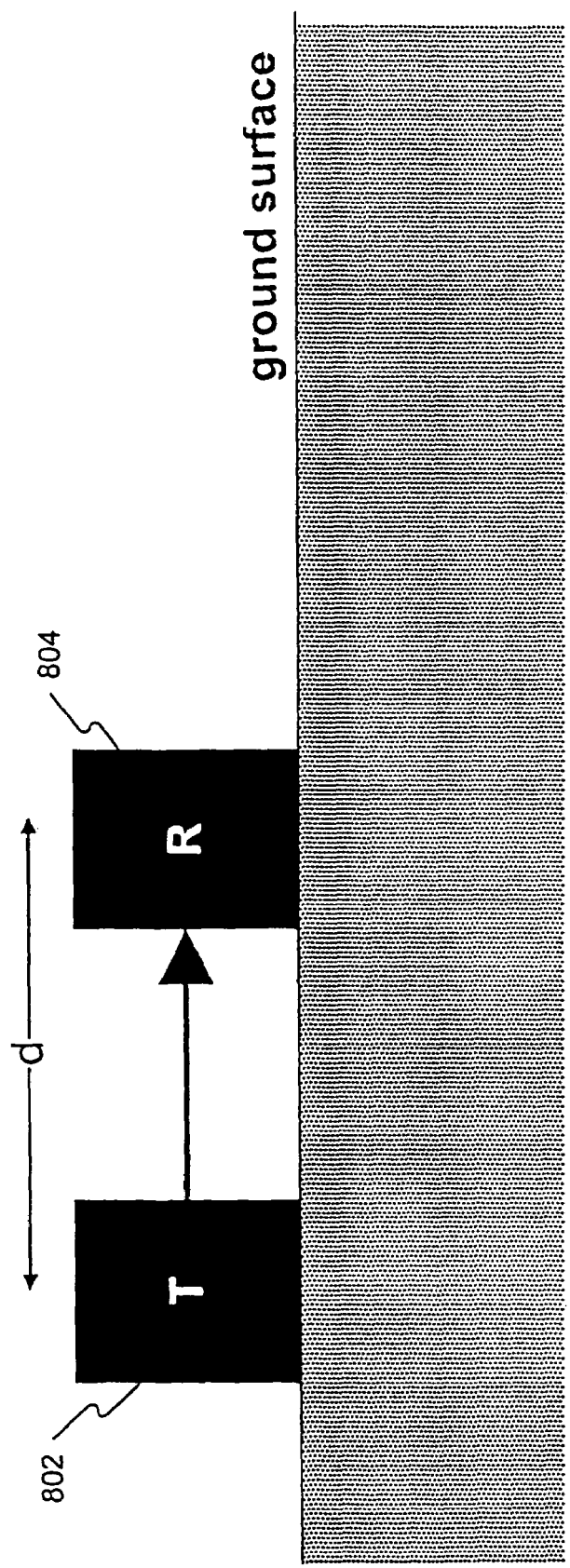
FIG. 8 is a schematic diagram of the distance between a transmitting antenna element and a receiving antenna element.

Time alignment is accomplished by recognizing that the wave sent from each transmitting antenna to each receiving antenna travels through air. The distance between any transmitter-receiver antenna pair is know. In FIG. 8, the distance between transmitting antenna element 802 and receiving antenna element 804 is labeled "d." The speed of light in air is also know: $c_{air}=3\times10^8$ meters per second. Accordingly, data processor 104 computes the time of this air propagated arrival using the following equation:

$$t_{air} = \frac{d}{c_{air}}. \tag{1}$$

Figure 9:
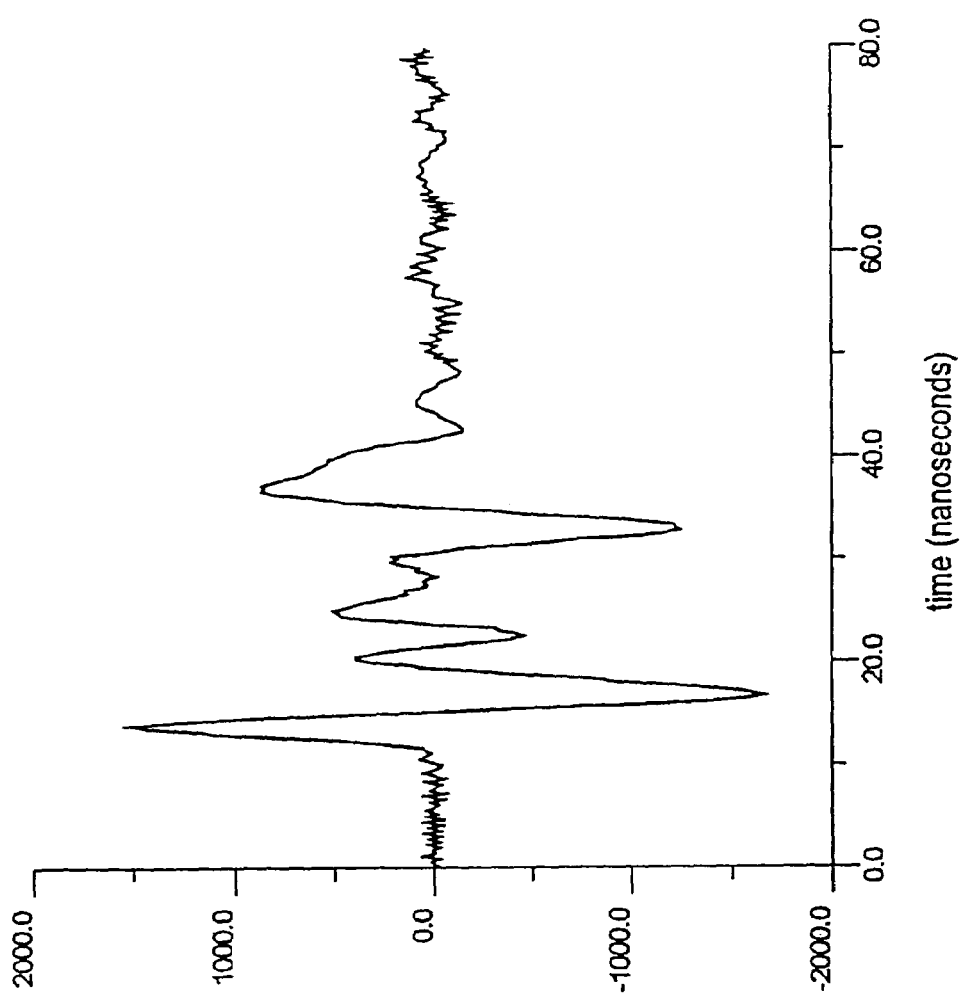
FIG. 9 is a graph of a received radar signal time series.

Because the wave speed in air is always greater than or equal to the speed of light in geological material, the earliest arriving signal will be from the air-propagated wave. For each transmitter-receiver pair, data processor 104 searches an acquired time series (FIG. 9) for the first arriving peak. As seen in FIG. 9, the peak at approximately twelve nanoseconds is the air-propagated arrival time and the peak at approximately forty nanoseconds in the ground-propagated arrival time. Data processor 104 then adjusts the acquired time series so that the arrival time of the first peak occurs at $t_{air}$ as determined from Eq. (1).

A GPR apparatus consistent with the present invention uses spatial correlations among time series acquired for various transmitter-receiver antenna element pairings. The travel distance r is related to the travel time $t_{arrival}$ by:

$$r = c_0 t_{arrival}, \tag{2}$$

where $c_0$ is the wave speed in the host medium. Data processor 104 computes the background wave speed $c_0$.

Figure 10:
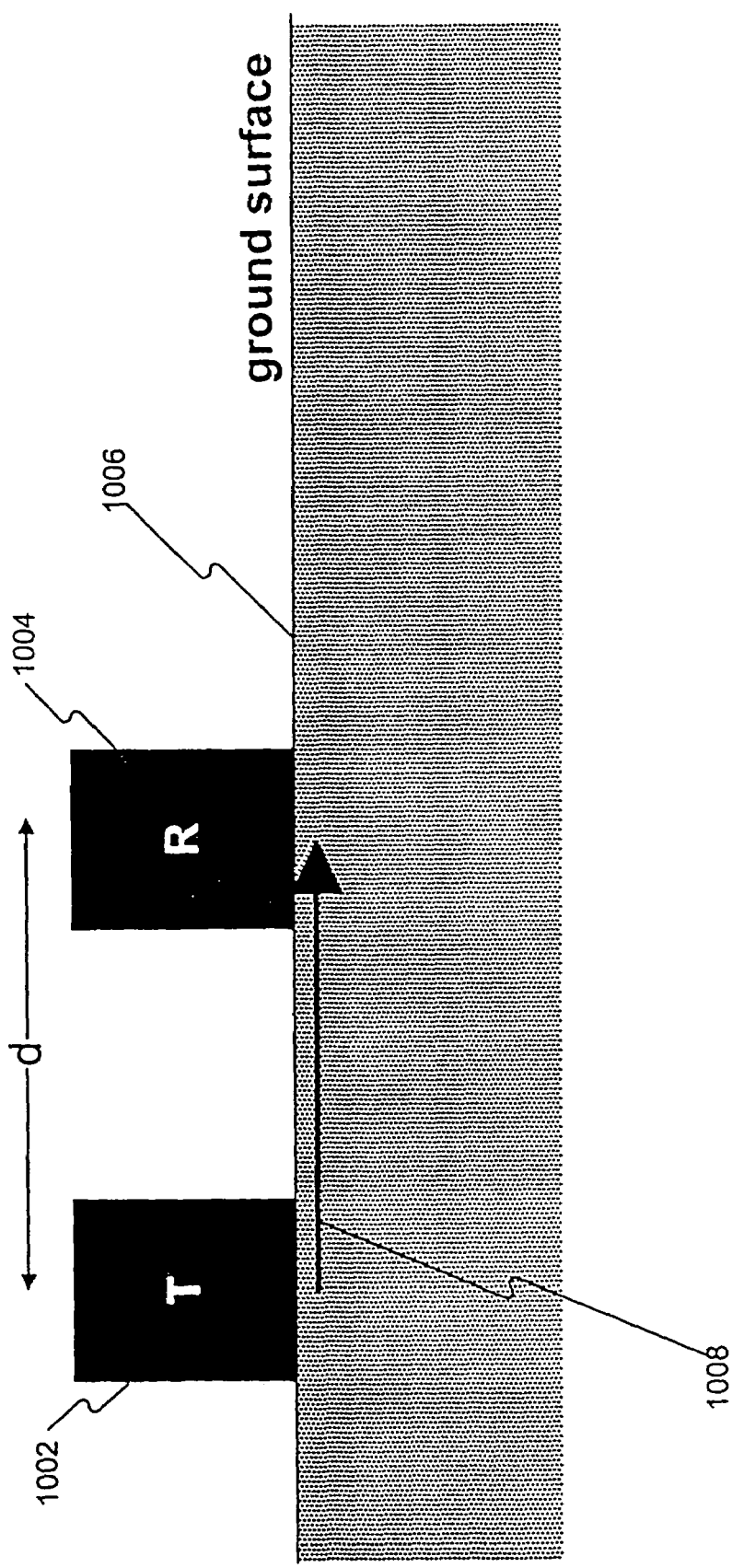
FIG. 10 is a schematic of a critically refracted ray in a GPR system.
Figure 11:
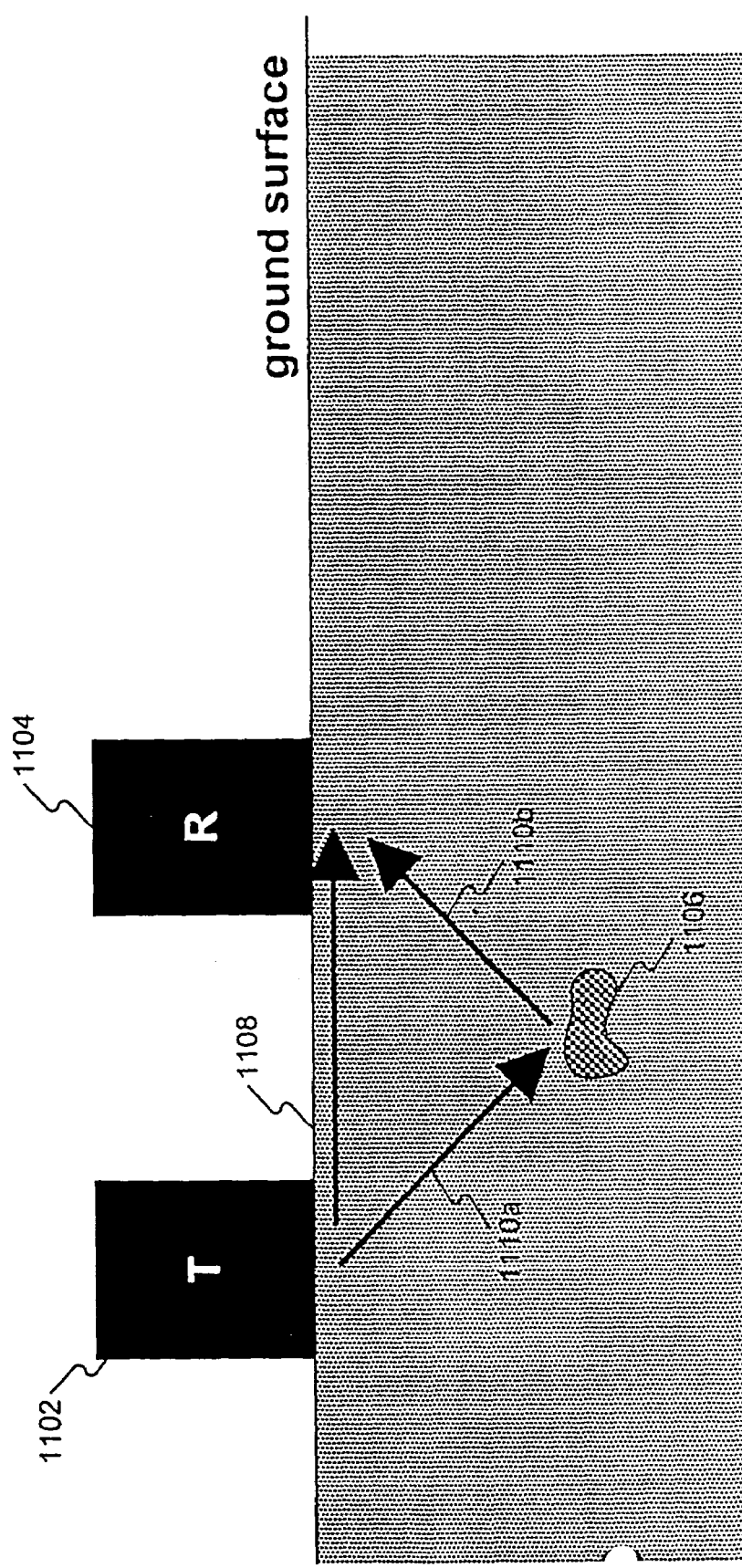
FIG. 11 is a schematic of a critically refracted ray and a reflected ray in a GPR system.

Data processor 104 computes $c_0$ by exploiting the fact that there will be a critically refracted ray (FIG. 10, 1008) that will propagate at speed $c_0$ horizontally between a transmitter (1002) and receiver (1004) just below the air-ground interface (1006). This ground-propagated arrival will occur later than the direct air-propagated arrival. Since this is the shortest ground-propagated ray path, this arrival will precede any ray paths associated with reflections from subsurface objects. This concept is illustrated in FIG. 11. FIG. 11 shows critically refracted ray path 1108 and ray path associated with a reflection 1110a, 1110b from subsurface object 1106. Since ray path 1108 for the critically refracted ray is shorter than the ray path associated with a reflection 1110a, 1110b, the arrival of the ground-propagated ray will precede that of the reflection.

Figure 12:
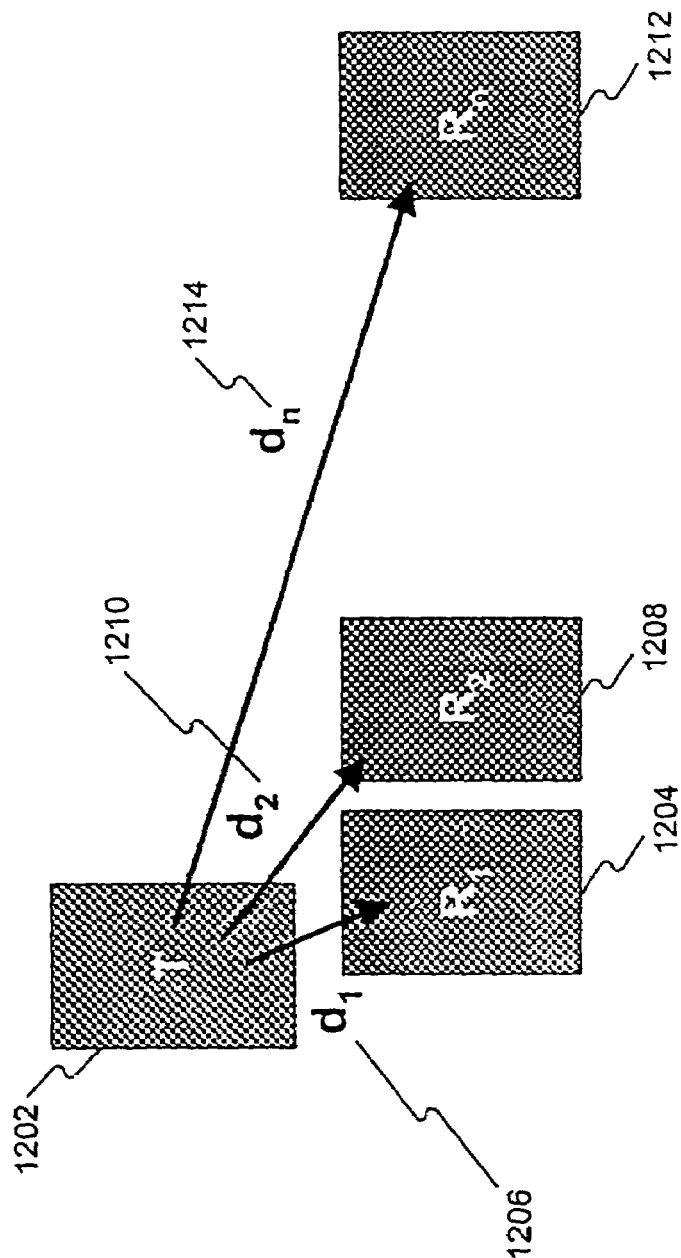
FIG. 12 is a schematic diagram of bistatic measurements for computing wave speed.

FIG. 12 is a schematic diagram of bistatic measurements for computing wave speed. The distance from the transmitter to receiver i is denoted by $d_i$. For example, in FIG. 12, $d_1$ is the distance 1206 between transmitting antenna (T) 1202 and receiving antenna ($R_1$) 1204; $d_2$ is the distance 1210 between transmitting antenna (T) 1202 and receiving antenna ($R_2$) 1208; and $d_n$ is the distance 1214 between transmitting antenna (T) 1202 and receiving antenna ($R_n$) 1212. Note also that when a transmit/receive antenna pair is used instead of an array as described above, the distance used is the distance from the transmitter to the receiver position.

Data processor 104 computes the arrival time for the critically refracted ray at receiver i using the equation:

$$t_i = \frac{d_i}{c_0}. \qquad (3)$$

As previously noted, the first major arrival is the air propagated arrival and the second major arrival is the critically refracted ground propagated arrival. Data processor 104 searches the time series for all receivers to find the $t_i$'s. If time alignment has been performed, data processor 104 can use Eq. (3) to compute $c_0$ directly by selecting a particular receiving antenna and, with $t_i$ and $d_i$ known using the following equation:

$$c_0 = \frac{d_i}{t_i}. \qquad (4)$$

Alternatively, all $t_i$'s and $d_i$'s can be used and $$\frac{1}{c_0}$$

is the slope of a linear fit for Eq. (3), e.g., the best linear fit.

If data processor 104 has not performed time alignment, a similar procedure can be applied using the time difference $\Delta t$ between the air and ground propagated arrivals. In this case, the appropriate relationship is given by the equation:

$$\Delta t_i = \frac{d_i}{c_0} - \frac{d_i}{c_{air}} \qquad (5)$$

rather than Eq. (3).

When using an array of antennas, there may be arrivals intermediate to the air- and ground-propagated arrivals. These are typically air-propagated and associated with reflections or multiple reflections with the antenna array. These artifacts are referred to herein as "ringing" and will be manifested as peaks in the power spectra of the acquired data. It may be necessary to remove this ringing before computing wave speed. This can be done by identifying the spectral peaks and applying appropriate spectral band-pass filters, such as Blackman-Harris filters, known to those skilled in the art prior to implementing any of the above-described procedures.

The following is an additional method for computing wave speed consistent with the present invention in a GPR system configured with a single transmitting antenna and one or more receiving antennas where the $i^{th}$ receiver is a distance $d_i$ away from the transmitting antenna (or when one receive element is used and moved to simulate an array, the distance used is the distance from the transmitter to the receiver position). If the transmitter is pulsed, the first two arriving signals at any receiver are transmitted through the air propagating at the wave speed in air, $c_a$, and a critically refracted ray propagating just below the air-ground interface at a wave speed $c_g$, where $c_g \neq c_a$.

Knowing the distance between the transmitter and receiver, the wave speed in the ground can be computed using the equation:

$$c_g = \frac{d}{\tau_g}, \qquad (6)$$

where d is the transmitter-receiver separation and $\tau_g$ is the measured travel time of the critically refracted ray through the ground. This procedure is useful when, for example, 1) the peak in amplitude as a function of time associated with the critically refracted ray can be clearly identified and 2) there is time registry in the acquired data. For radio waves, the information is traveling through the GPR system circuitry at about the same speed as the wave, time registry can be difficult resulting in an error in $\tau_g$ that will introduce an error in $c_g$ (Eq. 6). Since a time registry problem produces a time shift to the entire time series, the travel time $\tau_g$ will be effected; however, the difference in travel time between the critically refracted ray and the air-propagated ray $\tau_{g-a} = \tau_g - \tau_a$ will not be effected by this error. Consequently, data processor 104 uses this time difference to compute the wave speed $c_g$ using the equation:

$$d = c_a \tau_a = c_g \tau_g, \qquad (7)$$

where $c_a$ and d are know so that $$c_g = \frac{d}{\tau_{g-a} + \tau_a}. \qquad (8)$$

When there is substantial noise in the data (e.g., condition 2, above), it may not be possible to definitively identify the appropriate peaks within the time series so that direct implementation of Eq. (8) is impossible. In such cases, $\tau_{g-a}$ can be determined indirectly. Let $S_i(t)$ be a time series for a transmitter-receiver spacing of $d_i$ and define $s_i(\omega)$ to be the temporal Fourier transform of $S_i$, $$s_i(\omega) = \int dt\, e^{i\omega t} S_i(t). \qquad (9)$$

An auto-correlation of $S_i$ can have the form $$F_i(t) = \int d\omega e^{-i\omega t} \frac{s_i(\omega)s_i^*(\omega)}{s_i(\omega)s_i^*(\omega) + \epsilon}, \quad (10)$$

where the asterisk denotes complex conjugation and $\epsilon$ is small parameter to eliminate singularities and supress noise in the data. A plot of the time series $F_i$ can have three peaks; one at $t=0$ corresponding to the correlation of the air propagated arrival with itself and the ground propagated arrival with itself; as well as peaks at $\pm(\tau_a-\tau_g)$ corresponding to the correlations between air and ground propagated peaks. These peaks can be used to determine $\tau_{g-a}$ and Eq. (8) can then be employed to compute $c_g$.

An embodiment of data processor 104 can implement a variation of the above procedure using two receiving antennas at different distances from the transmitting antenna. Let $S_1$ and $S_2$ be time series for transmitter-receiver spacings of $d_1$ and $d_2$, respectively. A cross-correlation of the form $$F_{1-2}(t) = \int d\omega e^{-i\omega t} \frac{s_1(\omega)s_2^*(\omega)}{s_1(\omega)s_1^*(\omega) + \epsilon}, \quad (11)$$

will have significant peaks at $\tau_a^1-\tau_{a2}$, $\tau_g^1-\tau_g^2$, $\tau_g^1-\tau_a^2$, and $\tau_a^1-\tau_g^2$, where $\tau_a^i$ and $\tau_g^i$ are the air and ground propagated travel times, respectively, for the $i^{th}$ receiver. These time differences can be used by data processor 104 in various ways to compute $c_g$. For example, using the difference $\tau_g^1-\tau_g^2$; because $d_1=c_g\tau_g^1$ and, data processor 104 computes the wave speed using the following equation:

$$c_g = \frac{d_1 - d_2}{\tau_g^1 - \tau_g^2}. \quad (12)$$

Another calibration operation that can be performed by data processor 104 is the computation of an impulse response function for the GPR system. Ground penetrating radar antennas have spatially three-dimensional beam patterns that are frequency dependent. While it is possible to characterize these beam patterns by direct propagation measurements in air, these patterns will change when the antennas are dynamically coupled to a material with a dielectric or electrical conductivity that is different from air. In an embodiment of the present invention, data processor 104 characterizes antenna beam patterns from any array geometry by acquiring data over an object having a known location and known electromagnetic properties.

In the frequency domain, the acquired data at some point $r$ in the array of receivers for a transmitter position $r_0$ is expressed as $u$ $(r, r_0; k_0)$ where $k_0=\omega/c_0$ is the background wavenumber at frequency $\omega$. The wave field $u$ can be considered as the superposition of $u_0$, the wavefield that would exist in the absence of a buried object and $u'$, the perturbation to $u_0$ associated with the known buried object. With these definitions, the perturbed wave field is:

$$u'(r, r_0; k_0) = -\frac{k_0^2}{4\pi} \int dr' G(r-r'; k_0)u(r'-r_0; k_0)O(r'), \quad (13)$$

where G is the Green's function and O is the "object function" that characterizes the buried object:

$$O(r) = 1 - \frac{k^2(r)}{k_0^2}, \quad (14)$$

$$k_0^2 = \mu_0\epsilon_0\omega^2 + i\mu_0\sigma_0\omega,$$
$$k^2(r) = \mu_0\epsilon(r)\omega^2 + i\mu_0\sigma(r)\omega \quad (15)$$

In this equation: $\mu_0$ is the free-space magnetic permeability, $\epsilon_0$ and $\epsilon(r)$ are background and object dielectric constants, respectively; and $\sigma_0$ and $\sigma(r)$ are the background and object electrical conductivities, respectively. Since any object can be buried, a relatively small object can be selected such that the Born approximation is valid, in which case, the background wave field $u_0$ can be used in place of the total field $u$ in Eq. (13) to give $$u'(r, r_0; k_0) = -\frac{k_0^2}{4\pi} \int dr' G(r-r'; k_0)u_0(r'-r_0; k_0)O(r'). \quad (16)$$

Equation (16) can be used by data processor 104 for forwarding modeling where, given O, $u'$ is computed. Alternatively, data processor 104 can use this equation for inverse scattering where O is determined from known $u_0$ and measured $u'$. Here, it is assumed that $u_0$ and O are known, $u'$ is measured for a measurement configuration of interest, and Eq. (16) is used by data processor 104 to determine the impulse response function of the antenna array that includes the effects of the unknown beam pattern.

For point (monopole) receivers, the Green's function can be represented by the Weyl expansion $$G(r; k_0) = i \int \frac{d\alpha}{\sqrt{k_0^2-\alpha^2}} e^{i[\alpha \cdot r + \sqrt{k_0^2-\alpha^2}\,|\hat{z}\cdot r|]}, \quad (17)$$

where $\hat{z}$ is a unit vector in the vertical direction. For any arbitrary receiving antenna beam pattern, the Green's function can be written as $$G(r-r'; k_0) = i \int \frac{d\alpha}{\sqrt{k_0^2-\alpha^2}} A_R(\alpha; k_0) e^{i[\alpha \cdot (r-r') + \sqrt{k_0^2-\alpha^2}\,|\hat{z}\cdot(r-r')|]} \quad (18)$$

where the factor $A_R$ is included to represent the unknown receiving antenna beam pattern.

Similarly, the transmitting antenna beam pattern can be introduced into the background field $u_0$ in the form $$u_0(r'-r_0; k_0) = i_t \int \frac{d\beta}{\sqrt{k_0^2-\beta^2}} A_R(\beta; k_0) e^{i[\beta \cdot (r'-r_0) + \sqrt{k_0^2-\beta^2}\,|\hat{z}\cdot(r'-r_0)|]} \quad (19)$$

Substitution of Eqs. (18) and (19) into Eq. (16) yields a complicated relationship between $u'$ and O involving the product $A_R A_T$. For a fully bistatic geometry, the horizontal two-dimensional Fourier transform $$\tilde{u}'(\kappa, v; k_0) = \int dr \int dr_0 u'(r, r_0; k_0) e^{-i(\kappa \cdot r - v \cdot r_0)} \quad (20)$$

will "deconvolve" Eq. (16) yielding the linear relationship $$\tilde{u}'(\kappa, v; k_0) = \tilde{A}(\kappa, v; k_0) I(\kappa, v; k_0) \tilde{O}, \quad (21)$$

where $\tilde{A}$ is the two-dimensional spatial Fourier transform of $A_R A_T$, I is the impulse response function for monopole sources, and $\tilde{O}$ is the three-dimensional spatial Fourier transform of the object function.

Accordingly, data processor 104 uses Eq. (21) to compute the spatial Fourier transform of the impulse response function:

$$\tilde{A}(\kappa, v; k_0) I\left(\kappa, v; k_0\right) = \frac{\tilde{u}'(\kappa, v; k_0)}{\tilde{O}}, \quad (22)$$

for the array including the antenna beam patterns and spectral respnses in terms of the known O and measured u'.

Arrays that are not fully bistatic are either fully monostatic or bistatic in one direction and monostatic in the other. Accordingly, for these geometries, additional assumptions or approximations can be used by data processor 104 for deconvolving Eq. (16). One suitable assumption is that the object is buried about one wavelength deep or deeper. Since the burial depth of the reference object can be controlled during calibration, the validity of this assumption can be assured and a valid relationship such as that given by Eq. (16) can be developed. Thus, using the analytical framework described above, data processor 104 detects spatial correlations corresponding to the buried object in data from the GPR sensors.

The next element of the GPR systems of FIG. 1 is preprocessor 106. An embodiment of preprocessor 106 consistent with the present invention is comprised of a processor that executes stored computer program code designed to implement preprocessing operations. One skilled in the art will recognize that an embodiment of preprocessor 106 implemented entirely in software, entirely in hardware, or in an embodiment allocating preprocessing functions among hardware and software elements, either distributed or centralized, is consistent with the scope of the present invention.

Preprocessor 106 rejects elements in the acquired data associated with unwanted subsurface features and/or admits only targets of interest. For example, consider spatial frequency preprocessing of monostatic data. Frequently reflections from soil or geological strata produce strong reflections that can obscure other features of interest. These strata typically are nearly planar and horizontal. The two-dimensional spatial Fourier transform of a horizontal surface will be a delta function at the spatial frequency origin. An embodiment of preprocessor 106 consistent with the present invention removes such a feature using a notch filter for filtering a DC response. Since most naturally occurring strata are not perfectly horizontal, and may not be truly planar, preprocessor 106 relaxes the notched filter somewhat into a low-cut filter (e.g., "high-pass filter) to substantially suppress these strata. A Blackman-Harris filter is an example of an appropriate filter for this purpose. Similar spatial frequency filters can be used to admit features of interest. If targets of interest are buried utilities, for example, these have the rather unique characteristic of being long and thin. The spatial Fourier transform of such a shape will generate a DC response in the axial direction and a white response in the transverse direction. Thus, preprocessor 106 applies an appropriate filter to admit features having these characteristics.

Image processor 108 builds a data structure corresponding to an image of the buried object from the data processed by data processor 104. Image processor 108 can, for example, reconstruct the location, size, shape, and material properties of subsurface features in two-dimensions, three-dimensions, or as a sequence of two-dimensional images. An embodiment of image processor 108 consistent with the present invention is comprised of a processor that executes stored computer program code designed to implement image processing operations. One skilled in the art will recognize that an embodiment of image processor 108 implemented entirely in software, entirely in hardware, or in an embodiment allocating image processing functions among hardware and software elements, either distributed or centralized, is consistent with the scope of the present invention.

Embodiments of image processor 108 implement image processing algorithms including, but not limited to, synthetic aperture radar (SAR), migration, backpropagation, diffraction tomography, algebraic reconstruction tomography (ART), iterative ART, pseudo-inverse, and reverse time processing. One skilled in the art will recognize that other image processing algorithms are also suitable for implementing the functions performed by image processor 108. Moreover, some operations performed by preprocessor 106 can be incorporated directly into many of these imaging procedures of image processor 108 by introducing filters into the impulse response function.

Feature processor 110 processes a received GPR signal to characterize features present in the signal that correspond to properties of a detected buried object. An embodiment of feature processor 110 consistent with the present invention is comprised of a processor that executes stored computer program code designed to implement feature processor operations. One skilled in the art will recognize that an embodiment of feature processor 110 implemented entirely in software, entirely in hardware, or in an embodiment allocating feature processor functions among hardware and software elements, either distributed or centralized, is consistent with the scope of the present invention.

Feature processor 110 differentiates the GPR signal to characterize features based on differences in reconstructed material properties. An embodiment of feature processor 110 uses frequency domain processing, performing an inverse operation mapping frequency information to depth. When feature processor 110 processes a GPR signal that propagated through a non-conducting background, the reconstructed quantity is the object function, Eq. (14), which has the form $$O(x) = 1 - \frac{\varepsilon(x)}{\varepsilon_0} + i \frac{\sigma(x)}{\omega \varepsilon_0}. \quad (23)$$

In Eq. (23), O is complex and its real part, $$O_\varepsilon(x) = 1 - \frac{\varepsilon(x)}{\varepsilon_0}, \quad (24)$$

is a reconstruction of the spatial variations in dielectric constant. The imaginary part of O, $$O_I(x) = \frac{\sigma(x)}{\omega \varepsilon_0}, \quad (25)$$

explicitly involves the frequency.

Let $L^{-1}$ be the operator that maps the broadband data into the image, i.e., $$O = L^{-1}\{u'\}$$

is the inverse operator, so that L is the forward operator, $$u' = L\{O\}.$$

Using Eq. (23):

$$O_\sigma(x) = L^{-1}\{\omega L\{\omega O_I\}\} \quad (26)$$

where $$O_\sigma(x) = \frac{\sigma(x)}{\varepsilon_0}, \quad (27)$$

and the pair of images $O_\epsilon, O_\sigma$ characterize imaged features by their relative spatial variations in dielectric and electrical conductivity. Those skilled in the art will recognize that equations 23–27 can be extended to accommodate processing a GPR signal that propagated through a conducting background.

Feature processor 110 accomplishes further differentiation by recognizing how $O_\epsilon$ and $O_\sigma$ are related for certain material types. For example, plastic objects are characterized by low dielectric and low conductivity. Consequently, feature processor 110 recognizes that plastic objects exhibit an $O_\epsilon$ that is greater than background (positive) and an $O_\sigma$ that is, in general, less than background (negative). The converse is generally true for metal objects. For this reason, feature processor 110 generates an enhanced data set forming a picture of metal or plastic objects by examining $O_\epsilon - O_\sigma$. For metal objects, this difference could be strongly negative while, for plastic objects, it could be strongly positive. For other materials such as clay, wood, and concrete; feature processor 110 enhances features using the sum $O_\epsilon + O_\sigma$.

Detector 112 automatically identifies targets of interest. An embodiment of detector 112 consistent with the present invention is comprised of a processor that executes stored computer program code designed to implement detection operations. One skilled in the art will recognize that an embodiment of detector 112 implemented entirely in software, entirely in hardware, or in an embodiment allocating detection functions among hardware and software elements, either distributed or centralized, is consistent with the scope of the present invention.

Detector 112 determines whether an object detected in a surveyed region matches a predetermined target or belongs to a predefined target class. If the object in the surveyed region does match, detector 112 identifies the location of the object. An embodiment of detector 112 uses matched filters to compare a signal representing an object in a surveyed region to targets and target classes. In one embodiment of detector 112 using matched filters $u(r, \omega)$ is the acquired data over a measurement surface defined by r over a bandwidth spanned by $\omega$. Similarly, $v(r, \omega; x_0)$ is the data that would be acquired if the target of interest were centered at the point $x_0$. This target is present in the measured data set if $$F_c(x_0) = \sum_\omega \int dr\, u(r, \omega) v(r, \omega; x_0) \quad (28)$$

exceeds a threshold and the location of this target will be at the position $x_0$ that maximizes $F_c$.

Many other detection algorithms are suitable for implementation by detector 112 such, for example, Baysian statistics or the MUSIC algorithm.

Descriminator 114 is a signal processing element similar to detector 112 (described in detail above); however, descriminator 114 processes images reconstructed from received GPR signal data rather than processing the acquired GPR signal data directly. An embodiment of descriminator 114 consistent with the present invention is comprised of a processor that executes stored computer program code designed to implement descriminator operations. One skilled in the art will recognize that an embodiment of descriminator 114 implemented entirely in software, entirely in hardware, or in an embodiment allocating descriminator functions among hardware and software elements, either distributed or centralized, is consistent with the scope of the present invention.

There are a number of approaches to discrimination consistent with the present invention. For example, an embodiment of descriminator 114 performs a correlation operation similar to Eq. (28), but applied to images reconstructed from received GPR signal data. Other embodiments of descriminator 114 implement feature extraction algorithms, pattern recognition algorithms, and/or feature tracking algorithms that track a feature identified in one portion of the image throughout the entire image.

Display 116 proves an operator of the GPR system with visual feedback representing the surveyed region. An embodiment of display 116 consistent with the present invention is comprised of a graphical display device that can present an image to an operator (e.g., video screen, plotter, printer, etc.) and a processor that executes stored computer program code designed to implement display operations. One skilled in the art will recognize that an embodiment of display 116 implemented entirely in software, entirely in hardware, or in an embodiment allocating display functions among hardware and software elements, either distributed or centralized, is consistent with the scope of the present invention.

In an embodiment of display 116, the image presented to the operator takes the form of a three-dimensional rendering of the surveyed site or a sequence of two-dimensional images of the reconstruction. The reconstructions can be of a basic material property, such as dielectric, or a composite of multiple properties, such as reflectivity, object function or some statistical estimator. Other embodiments of display 116 consistent with the present invention present images to the operator as projections of reconstructed information onto a plane such as the ground surface.

The GPR system functions described for each of the elements above can be distributed or combined differently than stated above and still fall within the scope of the invention. For example, the GPR system can be implemented using a single processor or group of processors that execute software stored in a central memory, wherein the software relates to each of the above-described GPR system operations.

The operation of the GPR system elements as defined above provide an efficient system to rapidly and accurately locate buried objects. Therefore, in accordance with the present invention, the disclosed GPR system elements can be housed in many types of structures, including portable and mobile structures to allow rapid and accurate real-time surveying of a region of interest.

Figure 13:
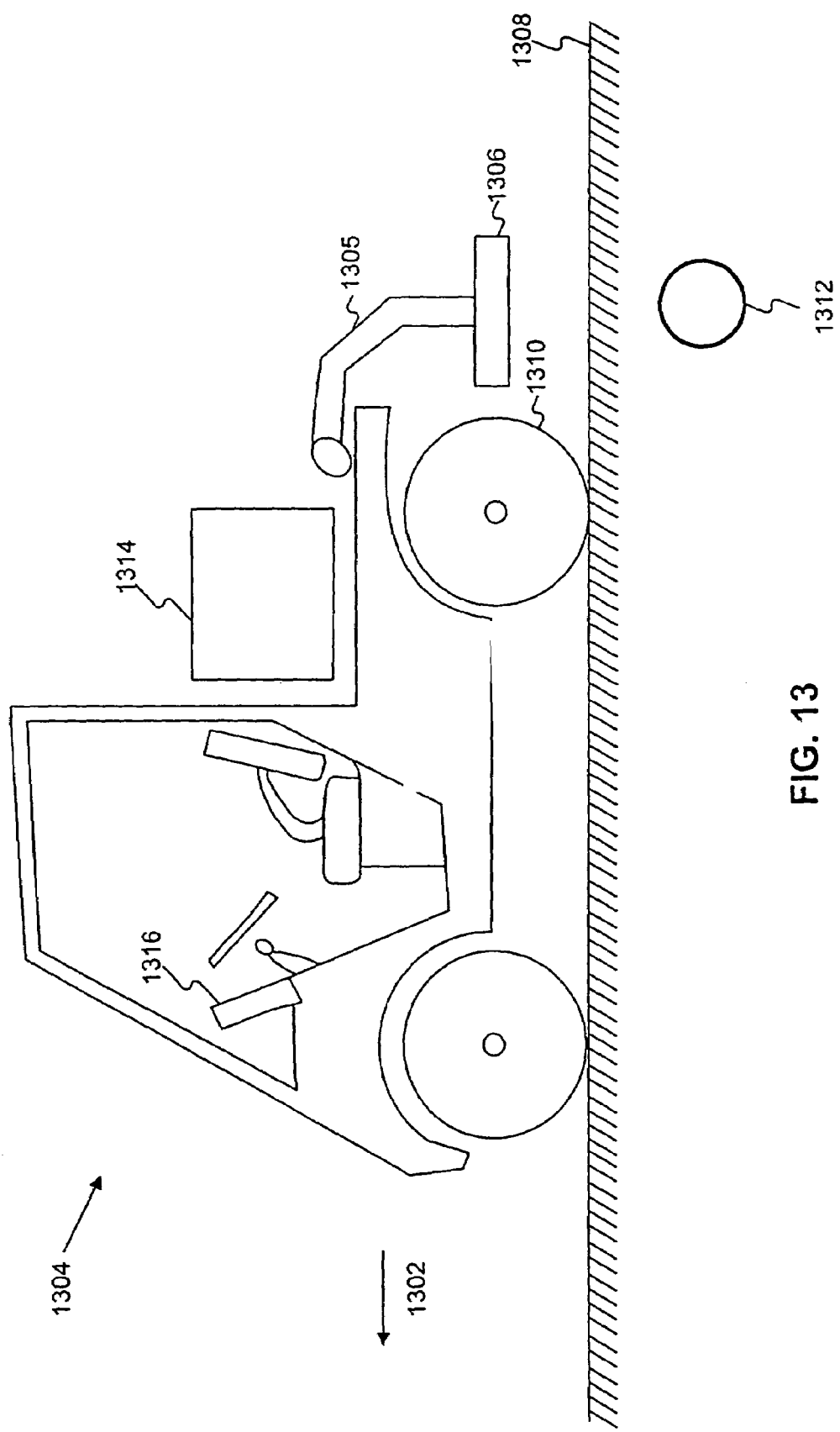
FIG. 13 is a diagram of a mobile vehicle with a GPR system.

FIG. 13 is a diagram of a mobile vehicle 1304 with a GPR system, consistent with this invention. A radar array 1306 attaches to an arm 1305, which attaches to the back a vehicle 1304, as shown in FIG. 13. Radar array 1306 may comprise at least one transmit antenna and at least one receive antenna. Vehicle 1304 may move in direction shown by arrow 1302. Radar array 1306 transmits impulses into ground 1308. The impulses may reflect off of a buried object, such as subterranean pipe 1312 and radar array 1306 may receive reflected waveforms. Module 1314 on the back of vehicle 1304 may comprise elements described in greater detail above for FIG. 1, which control array 1306 and process signals received by array 1306. It may also display on display 1316 images of buried objects from data acquired by sensor unit 102 in the surveyed region of interest (with or without images of the surrounding area).

Figure 14:
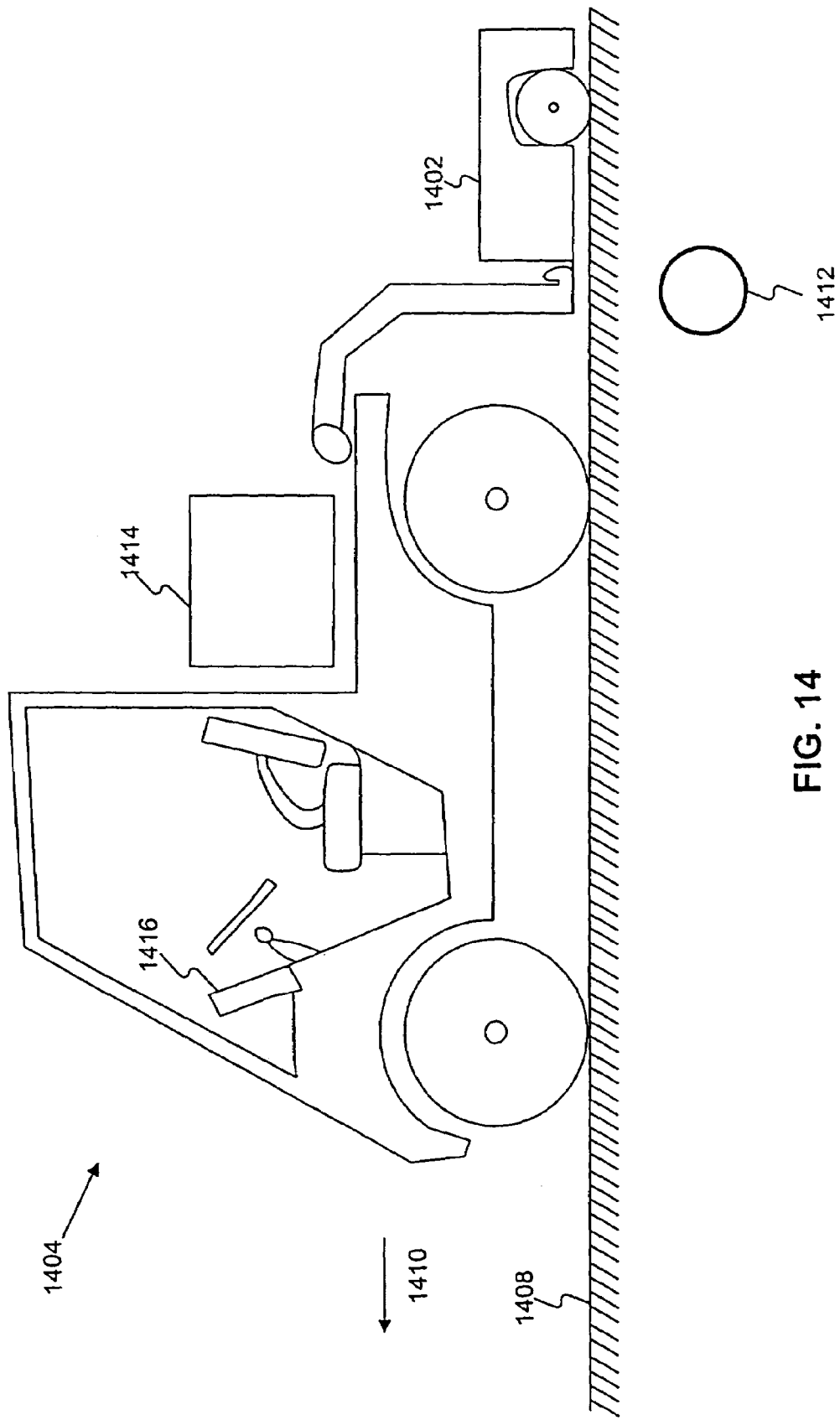
FIG. 14 is a diagram of a mobile vehicle with a GPR system.
Figure 15:
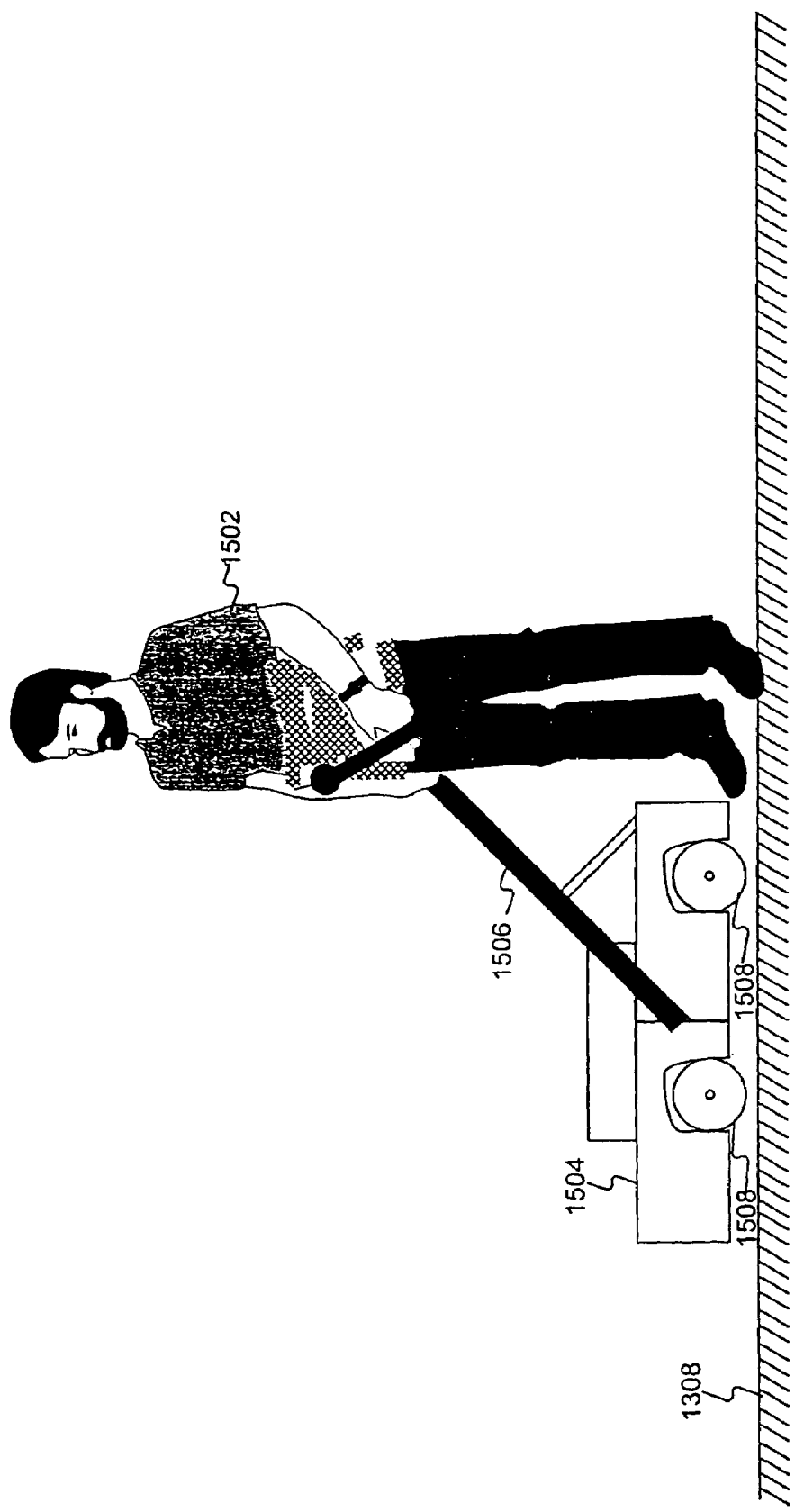
FIG. 15 is a diagram of a portable GPR system.

FIG. 14 is a diagram, consistent with this invention, of mobile vehicle 1404 with a trailer 1402 having a GPR system. In the embodiment shown in FIG. 14, radar array 1306 (not shown in FIG. 14) is within trailer 1402, which is attached to vehicle 1404. Trailer 1402 moves in the direction of arrow 1410 with vehicle 1404. FIG. 15 is a diagram, consistent with this invention, of a portable housing 1504 with a GPR system. In the embodiment shown in FIG. 15, radar array 1306 (not shown in FIG. 14) is within portable housing 1504. A user 1502 may guide portable housing 1504 over ground 1308 using handle 1506. Portable housing 1504 may have wheels 1508, skid pads (not shown), or neither. An embodiment of portable housing 1504 can also be made sufficiently light to allow an operator to carry the entire system, thereby alleviating the need for wheels, skid pads, or similar structure to guide the housing over the ground. Both the mobile system of FIG. 14 and the portable system of FIG. 15 may also display images of buried objects from data acquired by the sensor unit in the surveyed region of interest (with or without images of the surrounding area).

A GPR system consistent with the present invention can overcome the disadvantages of One Call, private locating, and SUE by providing a cost effective method to locate and image conductive and non-conductive utilities, vertically and horizontally, with a margin of error to satisfy many excavating needs. A GPR system consistent with the present invention can also provide a permanent record of images of the excavation site that can be used in the future. Further, a GPR system consistent with the present invention can fit onto a moving vehicle, trailer, or portable housing so that subsurface images can be formed as the system is moving.

It will be apparent to those skilled in the art that various modifications and variations can be made to the disclosed embodiments of the present invention without departing from the spirit or scope of the invention. Thus it is intended that the present invention cover the modifications and variations of this invention provided they come within the scope of the appended claims and their equivalents.

I claim:

1. An apparatus for identifying a buried object using ground penetrating radar (GPR) containing at least one GPR sensor, comprising:
   an image processor for building a data structure corresponding to an image of a subsurface region containing the buried object from data collected from the at least one GPR sensor;
   a feature processor for processing the data structure to extract at least one identifiable feature of the buried object from the data; and
   a discriminator for identifying the buried object from the at least one identifiable feature.

2. The apparatus of claim 1, further comprising a display for presenting a representation of the identified buried object.

3. The apparatus of claim 2, wherein the representation of the identified buried object presented by the display comprises a three-dimensional rendering of a surveyed site containing the buried object.

4. The apparatus of claim 2, wherein the representation of the identified buried object presented by the display comprises a sequence of two-dimensional images of a reconstruction of a surveyed site containing the buried object.

5. An apparatus for identifying a buried object using ground penetrating radar (GPR) in a system containing at least one GPR sensor, comprising:
   a data processor for processing data collected from the at least one GPR sensor to extract at least one identifiable feature of the buried object from the data; and
   a detector for identifying the buried object from the at least one identifiable feature, wherein the detector comprises a depth indicator for directing the detector to a specified depth range.

6. An apparatus for identifying a buried object using ground penetrating radar (GPR) in a system containing at least one GPR sensor, comprising:
   a data processor for processing data collected from the at least one GPR sensor to extract at least one identifiable feature of the buried object from the data; and
   a detector for identifying the buried object from the at least one identifiable feature, wherein the detector comprises a refractive index indicator for directing the detector to an object within a specified refractive index range.

7. A subsurface object locating system, comprising:
   at least one ground penetrating radar (GPR) sensor,
   a data processor, responsive to signals from the at least one GPR sensor, for generating data signals representative of a subsurface region scanned via the at least one GPR sensor;
   an image processor for building a three-dimensional data structure corresponding to an image of the subsurface region from data signals generated by the data processor;
   a feature processor for processing the three-dimensional data structure to extract an identifiable feature of an object buried the subsurface region; and
   a display for presenting a representation of the identified buried object, based on the extracted identifiable feature of the buried object.

8. The system of claim 7, wherein the representation of the identified buried object presented by the display comprises a three-dimensional rendering of a surveyed site containing the buried object.

9. The system of claim 7, wherein the representation of the identified buried object presented by the display comprises a sequence of two-dimensional images of a reconstruction of a surveyed site containing the buried object.

10. A program product comprising instructions embodied in a computer readable medium, wherein the instructions are for causing one or more programmable computers to perform steps, comprising:

processing signals from at least one GPR sensor to generate data signals representative of a subsurface region scanned by the at least one GPR sensor;

building a three-dimensional data structure corresponding to an image of the subsurface region from the data signals representative of the subsurface region;

processing the three-dimensional data structure to extract an identifiable feature of an object buried in the scanned subsurface region; and generating a three-dimensional representation of the buried object in the scanned subsurface region for display to a user, based on the extracted identifiable feature of the buried object.

* * * * *